United States Patent
Bhatt et al.

(10) Patent No.: US 12,229,606 B2
(45) Date of Patent: Feb. 18, 2025

(54) METHODS AND PRINTING SYSTEM USING RASTER IMAGE PROCESSORS (RIPs) CONFIGURED FOR PROCESSING A PREVIEW JOB

(71) Applicant: Kyocera Document Solutions Inc., Osaka (JP)

(72) Inventors: Jayant Bhatt, Torrance, CA (US); Arturo Becerra, Los Angeles, CA (US); Robert T. Cunningham, Concord, CA (US); Edwin Philip Lockwood, Brea, CA (US); Javier A. Morales, Rochester, NY (US)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 18/121,954

(22) Filed: Mar. 15, 2023

(65) Prior Publication Data

US 2024/0311598 A1    Sep. 19, 2024

(51) Int. Cl.

| | |
|---|---|
| *G06K 15/02* | (2006.01) |
| *G06F 3/12* | (2006.01) |
| *G06K 15/00* | (2006.01) |
| *G06F 40/106* | (2020.01) |

(52) U.S. Cl.
CPC ....... *G06K 15/1857* (2013.01); *G06F 3/1215* (2013.01); *G06F 3/124* (2013.01); *G06K 15/005* (2013.01); *G06K 15/1823* (2013.01); *G06K 15/1843* (2013.01); *G06F 40/106* (2020.01); *G06K 15/1867* (2013.01)

(58) Field of Classification Search
None
See application file for complete search history.

(56) References Cited

U.S. PATENT DOCUMENTS

| | | | |
|---|---|---|---|
| 6,816,276 B2 | 11/2004 | Sugano | |
| 7,262,876 B2 | 8/2007 | Wei et al. | |
| 11,983,585 B1* | 5/2024 | Bhatt | G06K 15/1863 |
| 2007/0195355 A1* | 8/2007 | Banton | H04N 1/2315 |
| | | | 358/1.15 |
| 2007/0240042 A1* | 10/2007 | Sato | G06F 3/1208 |
| | | | 715/209 |
| 2011/0285040 A1* | 11/2011 | Heit | G21C 3/58 |
| | | | 264/0.5 |
| 2013/0188211 A1* | 7/2013 | Matsushita | G06K 15/1848 |
| | | | 358/1.15 |
| 2014/0240740 A1* | 8/2014 | Salgado | G06F 3/1208 |
| | | | 358/1.15 |
| 2022/0174184 A1* | 6/2022 | Hayashi | H04N 1/6008 |
| 2024/0311597 A1* | 9/2024 | Bhatt | G06F 3/1256 |

* cited by examiner

*Primary Examiner* — Haris Sabah
(74) *Attorney, Agent, or Firm* — Millen, White, Zelano & Branigan P.C.; William F. Nixon

(57) ABSTRACT

A raster image processor (RIP) system is used in a printing system to process a variety of different jobs. A front end receives the jobs and determines the job type. The job types include a print job, a preview job, and an estimation job. Depending on the type of job, the front end configures the RIPs within RIP system accordingly to process the job. The RIPs may process the job in parallel, with a high performance RIP processing the first page of the job. If the job is not processed in parallel, then the front end assigns the job to a very high performance RIP. The front end also assigns the preview job to a preview RIP and the estimation job to an estimation RIP. The front end configures RIPs as needed.

9 Claims, 11 Drawing Sheets

METHODS AND PRINTING SYSTEM USING RASTER IMAGE PROCESSORS (RIPs) CONFIGURED FOR PROCESSING A PREVIEW JOB

FIELD OF THE INVENTION

The present invention relates to a printing system and associated methods to process jobs using raster image processors (RIPs) configured for optimal processing. More particularly, the present invention uses RIPs having a plurality of configurations to provide the optimal processing.

DESCRIPTION OF THE RELATED ART

Conventional raster image processors (RIPs) may have many major components. A RIP includes an interpreter that parses specific page description languages (PDLs), such as postscript or portable document format (PDF), into drawing commands. The RIP also includes a drawing unit that converts a drawing command into a metadata that can be consumed by a renderer. The drawing unit may contain a font rasterizer that converts text into bitmaps, a graphic services unit that converts images into a format recognized by the renderer, and drawings services that converts vector objects into metadata. The RIP also includes a renderer that generates raster output from the drawing metadata. The raster output from the renderer is sent to the imaging, or printing, device.

Implementation of RIPs usually is serial to process one page at a time. With the advent of production printing, a need arose to process pages faster compared to serial processing. Thus, production printing systems may implement parallel processing depending on the granularity of the work. Multiple jobs may be processes in parallel, pages of a job may be processed in parallel, or drawings of a page may be processed in parallel. The RIP configuration, whether processing jobs or pages in parallel, is implemented so all RIP instances are configured in the same manner. This aspect ensures uniform job processing as all RIP instances use equivalent system resources.

SUMMARY OF THE INVENTION

A method for performing printing operations is disclosed. The method includes receiving a job at a front end of a raster image processing (RIP) system. The method also includes assigning a plurality of segments of the job to a plurality of RIPs. A first set of the plurality of segments is assigned to a first group of the plurality of RIPs. A second set of the plurality of segments is assigned to a second group of the plurality of RIPs. The first group of the plurality of RIPs are configured differently than the second group of the plurality of RIPs. The method also includes processing the first set of the plurality of segments by the first group of the plurality of RIPs. The method also includes processing the second set of the plurality of segments by the second group of the plurality of RIPs. The method also includes storing processed segments from the first set of the plurality of segments and processed segments from the second set of the plurality of segments. The method also includes sending the processed pages of the job to a print engine.

A method for performing printing operations also is disclosed. The method includes receiving a job at a front end of a raster image processing (RIP) system. The method also includes assigning a first group of a plurality of RIPs to process the job. The first group of the plurality of RIPs include a first configuration. The method also includes determining that the first group of the plurality of RIPs are not able to process the job. The method also includes assigning a second group of the plurality of RIPs to process the job. The second group of the plurality of RIPs include a second configuration different than the first configuration of the first group of the plurality of RIPs. The method also includes processing the job by the second group of the plurality of RIPs.

A printing system also is disclosed. The printing system includes a printing device. The printing system also includes a controller connected to the printing device. The controller configured to receive a job for the printing device. The printing system also includes a raster image processing (RIP) system connected to the controller. The RIP system includes a front end to receive the job. The front end is configured to store the job. The RIP system also includes a first group of a plurality of RIPs having a first configuration. The RIP system also includes a second group of the plurality of RIPs having a second configuration. The front end assigns the job or segments of the job based on the first configuration of the first group or the second configuration of the second group. The first group of the plurality of RIPs and the second group of the plurality of RIPs process the job or segments of the job. The printing system also includes a print engine of the printing device to print the processed job.

A method for performing printing operations also is disclosed. The method includes receiving a print job at a front end of a raster image processing (RIP) system. The method also includes assigning the print job to be processed by at least one RIP within the RIP system. The method also includes determining that the at least one RIP is to process the print job with increased speed to improve performance with an increased number of renderers. The method also includes processing the print job at the at least one RIP with the increased number of renderers.

A method for performing printing operations also is disclosed. The method includes receiving a print job at a front end of a raster image processing (RIP) system. The method also includes assigning the print job to be processed by at least one RIP within the RIP system. The method also includes determining that the at least one RIP is to process the print job with increased speed for improved performance. The method also includes converting the at least one RIP into at least one very high performance RIP. The very high performance RIP is used to process the print job for which segments cannot be processed in parallel. The method also includes processing the print job at the at least one very high performance RIP.

A printing system also is disclosed. The printing system includes a printing device. The printing system also includes a controller within the printing device. The controller is configured to receive a print job. The printing system also includes a raster image processing (RIP) system. The RIP system includes a front end to store the print job. The RIP system also includes at least one RIP having an increased number of renderers. The at least one RIP processes the print job. The front end uses the at least one RIP having an increased number of renderers based on a requirement of the print job. The printing system also includes a print engine to receive the processed print job from the RIP system and to perform printing operations for the print job.

A method for performing printing operations also is disclosed. The method includes receiving a preview job at a front end of a raster image processing (RIP) system. The method also includes storing the preview job at the front end. The method also includes assigning the preview job to at least one RIP within the RIP system. The method also includes determining a preview RIP from the at least one RIP. The preview RIP is configured to generate a lower resolution and downscaled output than a standard RIP within the RIP system. The method also includes processing at least one segment of the preview job at the preview RIP.

A method for performing printing operations also is disclosed. The method includes receiving an estimation job at a front end of a raster image processing (RIP) system. The method also includes storing the estimation job at the front end. The method also includes assigning the estimation job to at least one RIP within the RIP system. The method also includes determining an estimation RIP from the at least one RIP. The estimation RIP is configured to generate an estimate output to be used for a consumable estimate for the print job. The method also includes processing at least one segment of the estimation job at the estimation RIP.

A printing system also is disclosed. The printing system includes a printing device. The printing system also includes a controller configured to receive a preview job at the printing device. The printing system also includes a raster image processor (RIP) system connected to the controller. The RIP system includes a front end to receive the preview job. The front end is configured to store the preview job. The RIP system also includes a preview RIP configured to process at least one segment of the preview job to generate a preview image. The preview RIP is configured to generate a lower resolution and downscaled output than a standard RIP within the RIP system. The front end assigns the at least one segment of the preview job to the preview RIP. The printing system also includes a device to display the preview image from the preview RIP.

A printing system also is disclosed. The printing system includes a printing device. The printing system also includes a controller configured to receive an estimation job at the printing device. The printing system also includes a raster image processor (RIP) system connected to the controller. The RIP system includes a front end to receive the estimation job. The front end is configured to store the estimation job. The RIP system also includes an estimation RIP configured to process at least one segment of the estimation job to generate an estimate output to be used for a consumable estimate for the print job. The estimation RIP is configured to release resources faster than a standard RIP within the RIP system. The front end assigns the at least one segment of the estimation job to the estimation RIP.

BRIEF DESCRIPTION OF THE DRAWINGS

Various other features and attendant advantages of the present invention will be more fully appreciated when considered in conjunction with the accompanying drawings.

DETAILED DESCRIPTION OF THE PREFERRED EMBODIMENTS

Figure 1:
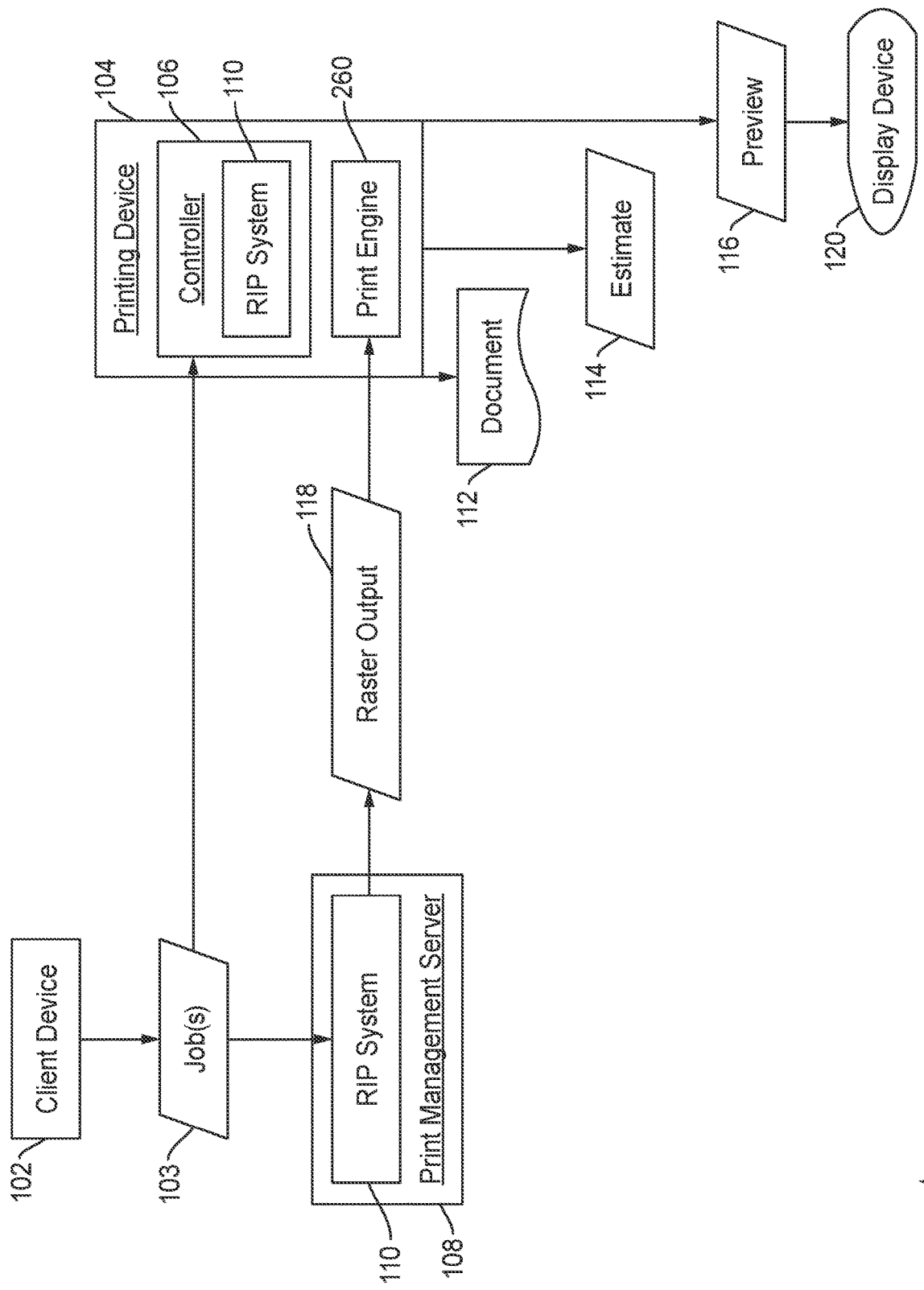
FIG. 1 illustrates a printing system for managing jobs according to the disclosed embodiments.

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims.

The disclosed embodiments provide an enhanced, or smart, raster image processor (RIP) system that enables optimal processing using parallel processing. The smart RIP system includes a front end unit and RIP instances. All RIP instances as well as the front end operate in parallel to each other. The RIP instances may be configured to perform a variety of rendering in parallel, like rendering standard pages, rendering error pages, fast rendering, and the like. The front end contains multiple subunits that also may operate in parallel to perform a variety of functions, like spooling a job, managing jobs, managing pages or segments in a job, managing the RIP instances, managing drives, determining the page description language (PDL) type, distributing pages or segments to the RIP instances, serializing pages or segments, sending notifications, and the like. The smart RIP system may render multiple pages or segments of a job as well as multiple jobs in parallel. Some RIP instances may be configured differently to allocate different amounts of system memory, different thread priority, or a different number of parallel rendering threads.

The RIP system may include different configured RIP instances, or RIPs. These different configurations allow the RIP system to dynamically process jobs, even jobs that are not print jobs. Standard RIPs may be those RIPs configured to balance the performance of individual RIPs with the overall performance of many parallel RIP instances. Standard RIPs are used to process most jobs as they provide the highest performance for normal job processing. The majority of parallel RIPs in the RIP system should be configured as standard RIPs.

Another type of RIP is high performance RIPs. These RIPs are configured to be somewhat more performant versus standard RIPs. High performance RIPs may have additional memory, higher priority, and use more parallel processing threads. High performance RIPs may be used to process the first page of most print jobs. This feature may allow the disclosed embodiments to improve first page out performance.

Very high performance RIPs may be those RIPs configured to be more performant at the expense of the overall performance of many parallel RIP instances. Very high performance RIPs may have large memory allocations to the point where the number of instances may be limited. These RIPs also may have higher priority and use more parallel rendering threads. Very high performance RIPs support less parallel processing as compared to standard RIPs. Very high performance RIPs also may be used to process jobs that do not support page-parallel processing. These jobs may still be processed in a job-parallel manner. Very high performance RIPs can be used to process legacy, or non-DSC, postscript jobs.

Preview RIPs may be those RIPs configured to quickly generate lower resolution output or thumbnails as compared to RIPs that generate output for printing. Preview RIPs may have the same resources as a standard RIP or a high performance RIP but are configured to generate a lower resolution output. These RIPs are optimized for quickly generating lower-resolution previews. In particular, they generate particular previews that are generated interactively in response to operator actions.

Estimate RIPs may be those RIPs that are configured to process jobs without impacting production, or the processing of jobs for printing. Estimate RIPs may have reduced memory allocation, lower priority, and a reduced number of renderers as compared to standard RIPs. Estimate RIPs are used to estimate ink or toner use for jobs. The term "consumable" may refer to ink or toner, as disclosed below. While consumable use estimation is done at the operator's behest, this process is not time sensitive so estimate RIPs are configured to use minimal resources so consumable use estimation may be done without impacting production. An estimate RIP may be further configured to bypass the realtime portion of the imaging pipeline.

Failover RIPs may be those RIPs configured to process pages or segments that could not be processed by standard or high performance RIPs. Failover RIPs may use additional memory but have a reduced number of parallel renderers as compared to standard RIPs. These RIPs are used to handle jobs that may fail other RIP instances due to out of memory errors. Failover RIPs also may be a last resort to render a page before the job is cancelled.

In order to improve overall system responsiveness and performance, the disclosed embodiments will launch standard and high performance RIPs. Job pages can be immediately sent to these RIPs for optimal job processing performance. Other differentially-configured RIPs may be launched as the need arises. For example, the system may shut down some of the standard or high performance RIPs in order to use system resources in the most optimal manner.

In one example, the RIP system may shut down standard RIPs and launch a very high performance RIP to process a job serially when the job does not support page parallel processing. In another example, if the operator opens the job preview interface in the user interface, the RIP system may shut down standard RIPs and launch preview RIPs to render the document pages based on the operator's browsing of the document. The preview RIPs may render the pages that the operator opens and pages around the pages that the operator opens in order to improve responsiveness. This feature occurs for a large job preview for the operator to use to inspect job details as opposed to a thumbnail.

In another example, if the operator requests an ink estimate, then the RIP system may launch an estimation RIP that will process the job alongside production printing processing operations. In another example, if a job page fails due to insufficient memory, then the RIP system may launch a failover RIP to process that page.

The disclosed embodiments enable a RIP system that supports differentially-configured RIPs. This feature provides the ability to change the number of renderers per interpreter. The disclosed embodiments also enable a RIP system that changes the number of RIP instances based on its workload, which includes shutting down certain classes of RIPs with different configurations. The disclosed embodiments also enable a RIP system that processes different kinds of jobs in RIPs with different configurations. The disclosed embodiments also enable a RIP system that uses different RIPs with different configurations for different purposes. The RIP system configures RIP instances with different imaging pipelines. The disclosed embodiments also enable a RIP system that retries failed jobs or job pages in a differently configured RIP.

The RIP system may include a front end and RIP instances, as disclosed in greater detail below. The smart RIP system may work as follows. The front end receives a job from the client or a device via internet protocols like HTTPS, FTP, LPD, TCP/IP, and the like. The job is spooled to a configurable drive. The front end determines the PDL type of the job. The front end then creates a cross reference table in a shared memory that can be accessed by the RIP instances. The front end also creates print ticket information in the shared memory. The front end determines the number of RIPs and types of RIPs to be used depending on the job. The pages or segments of the job are then distributed to the RIPs using inter-process communication.

The RIPs read the cross reference table, print ticket information, and the spooled data. A RIP instance only processes the pages or segments that it is told to process by the front end. The RIPs parse the page of a job, creates metadata from the drawing commands and renders the metadata to a desired format. The RIPs write the metadata to a drive for printing.

Thus, the disclosed smart RIP system is able to achieve optimal performance with parallel processing. It also achieves optimal drive usage using a disk manager. A RIP manager keeps track of the RIPs, and automatically spawns the RIPs that are no longer active due to a fault. The disclosed embodiments allow for error handling using a failover RIP. The disclosed smart RIP system also provides distribution of rendering to the proper RIPs depending on the job type.

FIG. 1 depicts a printing system 100 for managing jobs using RIP system 110 according to the disclosed embodiments. Printing system 100 may be located in a print shop or other environment suitable for production printing operations. Printing system 100 includes one or more printing devices 104 that receive jobs 103 from one or more client terminals 102.

Printing device 104 receives jobs through printing system 100, such as job 103. In some embodiments, job 103 is a print job. After processing job 103, printing device 104 may print or produce document 112 in a paper or media specified by the print job. Printing device 104 is disclosed in greater detail in FIG. 2. Printing device 104 also includes a controller, or digital front end (DFE), 106, which facilitates processing job 103. Controller 106 also includes RIP system 110, which is disclosed in greater detail below.

For example, controller 106 may use RIP system 110 to convert bitmap images, vector graphics, fonts, and the like associated with pages in job 103 to bitmap/rasterized representations of the pages, such as C, M, Y, and K pixels. The sum of the values of pixels of a particular color in the rasterized pages may be proportional to the amount of consumables used by printing device 104 to print that color. RIP system 110 may rasterize pages of job 103 according to various image rasterization settings. For example, these image rasterization parameters may include calibration curves, paper definitions, ICC profiles, spot color definitions, TRCs, color conversion settings, colorant limits for ink or toner, rendering intent, K preservation, CGR level, max colorant densities, print margins, halftones, and the like.

Print engine 260 also is included with printing device 104. Printing device 104 may correspond to an industrial printing device capable of printing thousands of pages in an hour. Printing device 104 may be ink-based, toner-based, or both. Print engine 260 may include various parameters that can control the operation of printing device 104. For example, these settings may include printing device maintenance settings that control or effect head cleaning intervals, head clogging prevention intervals, and the like of printing device 104. Print engine 260 receives raster output from RIP system 110 in printing device 104 to print document 112 based on job 103.

Printing system 100 receive job 103 and may route it directly to printing device 104. Alternatively, printing system 100 may route job 103 to print management server 108. Print management server 108 may seek to offload processing of job 103 from controller 106 of printing device 104. This feature may be desirable if controller 106 does not have the processing capacity to handle jobs 103 in a production printing environment. Thus, print management server 108 also may include RIP system 110 that can provide raster output 118 directly to print engine 260 of printing device 104. These embodiments allow controller 106 to offload processing in order to handle other operations. Further, updates to RIP system 110 may occur at print management server 108 prior to any updates to RIP system 110 in printing device 104.

Job 103 is not always a print job that produces document 112. In some embodiments, job 103 may be an estimation job or a preview job. RIP system 110 determines which type of job is job 103 and configures itself accordingly. For an estimation job, RIP system 110 configures RIPs to process job 103 without impacting print processing within controller 106. The estimation RIPs process job 103 to provide an ink or toner estimate 114. Estimate 114 may be provided to an operator without engaging print engine 260.

For a preview job, RIP system 110 configures RIPs to process job 103 to quickly generate a lower resolution output as preview 116. Preview 116 may be a lower resolution output as compared to document 112 and estimate 114. Preview 116 is provided to the operator to review. Preview 116 may be provided to display device 120 for the operator to review and interact with using an interface. Display device 120 may be a separate device from client device 102 and printing device 104. In other embodiments, display device 120 may be incorporated within client device 102 or printing device 104.

As disclosed above, RIP system 110 may be a smart system that enables optimal processing by using parallel processing to handle a variety of jobs 103. Different jobs received at printing device 104 or print management server 108 result in different output, such as document 112, estimate 114, or preview 116. The RIP instances within RIP system 110 are configured according to the type of job 103 is received.

Figure 2:
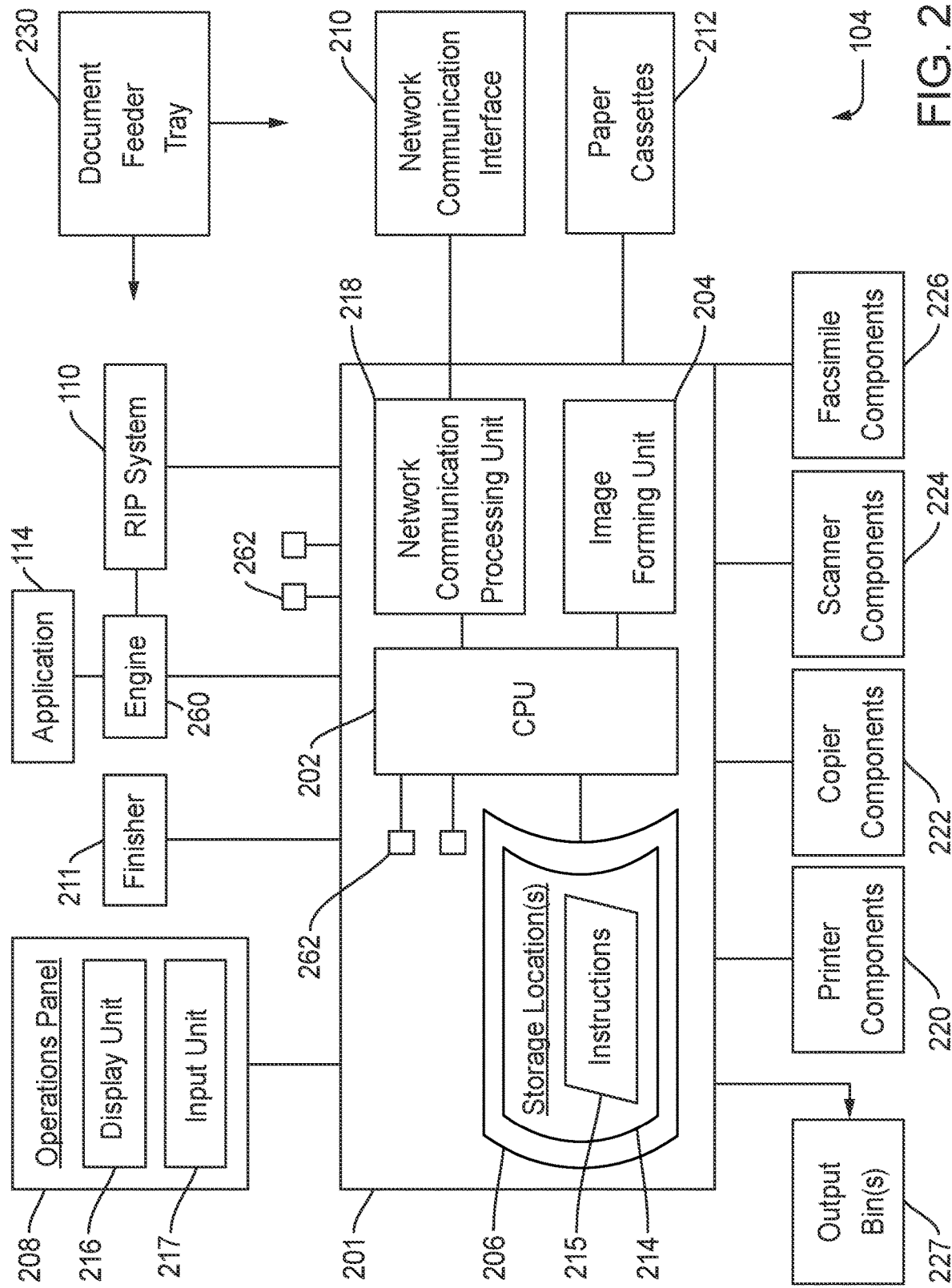
FIG. 2 illustrates a block diagram of components of the printing device for use within the printing system according to the disclosed embodiments.

FIG. 2 depicts a block diagram of components of printing device 104 according to the disclosed embodiments. The architecture shown in FIG. 2 may apply to any multi-functional printing device or image forming apparatus that performs various functions, such as printing, scanning, storing, copying, and the like within printing system 100. As disclosed above, printing device 104 may send and receive data from client device 102, print management server 108, if a separate device, and other devices within system 100.

Printing device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104, using computing platform 201, may be configured to perform various operations, such as scanning, copying, printing, receiving or sending a facsimile, or document processing. As such, printing device 104 may be a printing device or a multi-function peripheral including a scanner, and one or more functions of a copier, a facsimile device, and a printer. To provide these functions, printing device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like. Paper cassettes 212 supply paper to various components 220, 222, 224, and 226 to create the image formed surfaces on the papers. Paper cassettes 212 also may be known as paper trays. Paper cassettes 212 may include papers having various sizes, colors, composition, and the like. Papers or media within paper cassettes 212 may be considered "loaded" onto printing device 104. The information for printing these papers may be captured in a paper catalog stored at controller 106. Paper cassettes 212 may be removed to refill as needed. The printed papers from components 220, 222, 224, and 226 are placed within one or more output bins 227. One or more output bins 227 may have an associated capacity to receive finished print jobs before it must be emptied or printing paused. The output bins may include one or more output trays.

Document processor input feeder tray 230 may include the physical components of printing device 104 to receive papers and documents to be processed. Feeder tray also may refer to one or more input trays for printing device 104. A document is placed on or in document processor input feeder tray 230, which moves the document to other components within printing device 104. The movement of the document from document processor input feeder tray 230 may be controlled by the instructions input by the user. For example, the document may move to a scanner flatbed for scanning operations. Thus, document processor input feeder tray 230 provides the document to scanner components 224. As shown in FIG. 2, document processor input feeder tray 230 may interact with print engine 260 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104. For example, a storage location 214 may include data for running an operating system executed by computing platform 201 to support the components within printing device 104. According to the disclosed embodiments, memory unit 206 may store the tokens and codes used in performing the deferral operations for printing device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter codes or other information into printing device 104.

Display unit 216 also may serve as to display results from print management server 108. Display unit 216 may act as display device 120 for displaying preview 116 after it is generated by RIP system 110.

Printing device 104 also includes network communication processing unit 218. Network communication processing unit 218 may establish a network communication using network communication interface 210, such as a wireless or wired connection with one or more other image forming apparatuses or a network service. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device 104.

Printing device 104 also includes print engine 260, as disclosed above. Engine 260 may be a combination of hardware, firmware, or software components that act accordingly to accomplish a task. For example, engine 260 is comprised of the components and software to print a document. It may receive instructions from computing platform 201 after user input via operations panel 208. Alternatively, engine 260 may receive instructions from other attached or linked devices.

Engine 260 manages and operates the low-level mechanism of the printing device engine, such as hardware components that actuate placement of ink or toner onto paper. Engine 260 may manage and coordinate the half-toner, toner cartridges, rollers, schedulers, storage, input/output operations, and the like. RIP system 100 that interprets the page description languages (PDLs) would transmit and send instructions down to the lower-level engine 260 for actual rendering of an image and application of the ink onto paper during operations on printing device 104. RIP system 110 may be located in DFE 106, as disclosed above. Alternatively, RIP system 110 may be located on print management server 108 and directly communicates with print engine 260.

Printing device 104 may include one or more sensors 262 that collect data and information to provide to computing platform 201 or CPU 202. Each sensor 262 may be used to monitor certain operating conditions of printing device 104. Sensors 262 may be used to indicate a location of a paper jam, failure of hardware or software components, broken parts, operating system problems, document miss-feed, toner level, as well as other operating conditions. Sensors 262 also may detect the number of pages printed or processed by printing device 104. When a sensor 262 detects an operational issue or failure event, it may send a signal to CPU 202. CPU 202 may generate an error alert associated with the problem. The error alert may include an error code.

Some errors have hardware-related causes. For example, if a failure occurred in finisher 211, such as a paper jam, display unit 216 may display information about the error and the location of the failure event, or the finisher. In the instance when the paper jam occurs in paper cassettes 212, display unit 216 displays the information about the jam error as located in one of the paper cassettes.

Some errors have a type of firmware-related cause. For example, network communication processing unit 218 may cause a firmware or software error. Display unit 216 may display the firmware-related error, any applicable error codes, and provide recommendations to address the error, such as reboot the device.

Memory unit 206 may store the history of failure events and occurred errors with a timestamp of each error. Printing device 104 communicates with other devices within system 100 via network communication interface 210 by utilizing a network protocol, such as the ones listed above. In some embodiments, printing device 104 communicates with other devices within system 100 through REST API, which allows the server to collect data from multiple devices within system 100. REST API and SOAP are application protocols used to submit data in different formats, such as files, XML messages, JSON messages, and the like. By utilizing applicable network communication protocols and application protocols, printing device 104 submits and receives data from client device 102 and print management server 108 as well as other printing devices within printing system 100.

Figure 3:
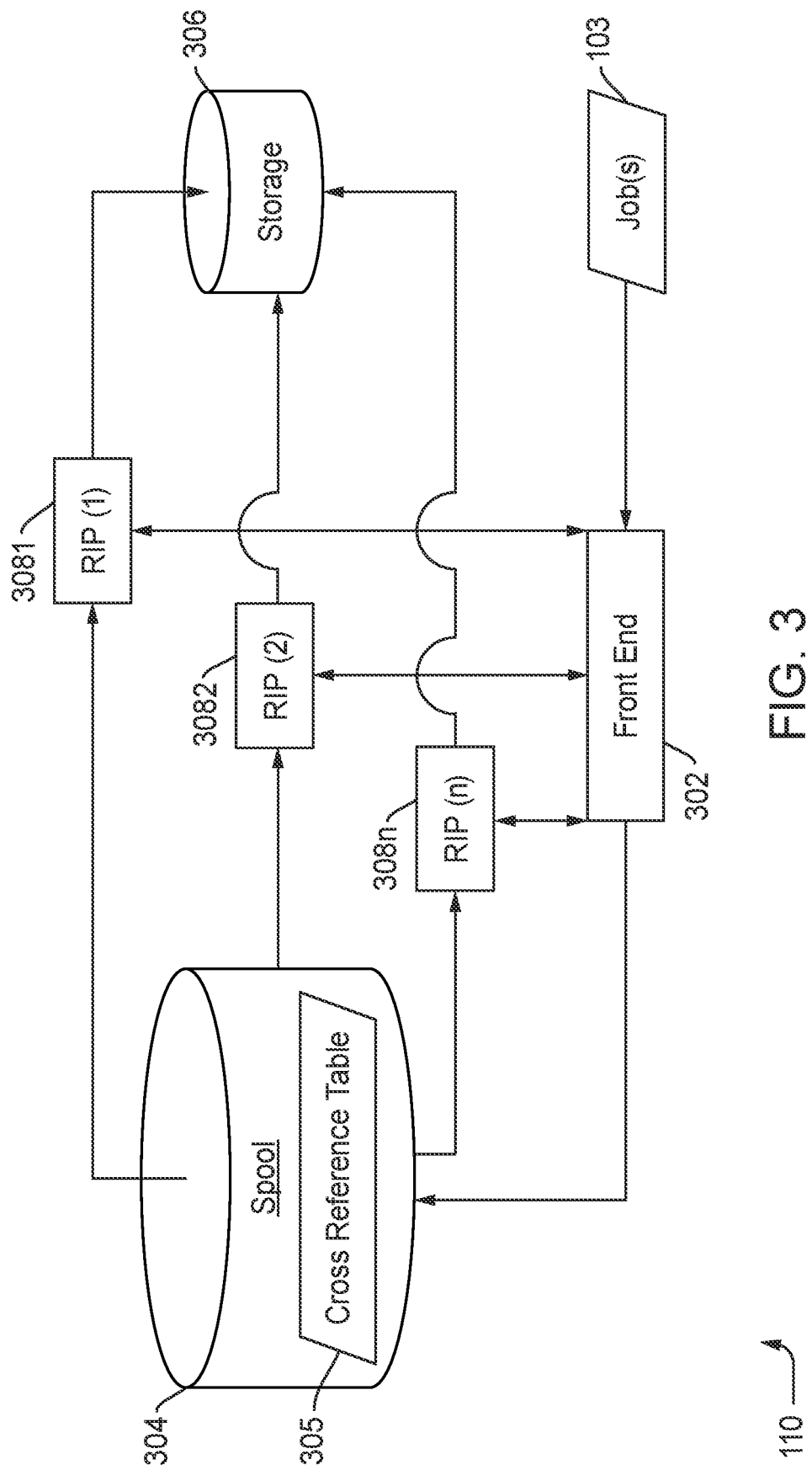
FIG. 3 illustrates a block diagram of a RIP system for use in processing a job in the printing system according to the disclosed embodiments.

FIG. 3 depicts a block diagram of RIP system 110 for use in processing job 103 in printing system 100 according to the disclosed embodiments. As disclosed above, RIP system 110 may be located in controller 106 of printing device 104. It also may be located on print management server 108 such that it communicates directly with print engine 260 of printing device 104.

RIP system 100 include front end 302 and RIP instances RIP 3081, RIP 3082, and RIP 308*n*. A RIP instance may be a RIP configured by front end 302 to process job 103. A RIP instance may be a standard RIP, a high performance RIP, a very high performance RIP, a preview RIP, an estimation RIP, or a failover RIP. All RIP instances and front end 302 operate in parallel to each other.

Front end 302 performs a variety of operations. It may contain multiple subunits that operate in parallel to perform the variety of operations, like spooling job 103, managing job 103, managing pages or segments of job 103, managing RIP instances 3081, 3082, and 308*n*, managing drives, determining the PDL type of job 103, distributing pages of segments of job 103 to the RIP instances, serializing pages or segments of job 103, sending notifications within printing device 104 or print management server 108.

Front end 302 may receive job 103 through printing system 100. Job 103 may be received from client device 102 via internet protocols within printing system 100. Job 103 may be spooled by front end 302 and stored in spool drive 304. Spool drive 304 may be a configurable drive. Front end 302 determines the PDL type of job 103. It then creates a cross reference table 305 in spool drive 304, which acts as a shared memory with RIP instances 3081, 3082, and 308*n*. Front end 302 also may create print ticket information in spool drive 304.

Front end 302 analyzes job 103 to determine which type of job it is. It uses this information to determine the number of RIPs and type of RIPs to be used in processing job 103. These features are disclosed in greater detail below. Depending on the type of job, front end 302 configures RIP instances 3081, 3082, and 308*n*. A configuration operation may create a RIP having a certain number of renderers. For example, RIP instance 3081 may be a standard RIP having a normal number of renderers, such as 4. RIP instance 3082 may be a high performance RIP that has a higher number of renders, such as 6. Front end 302 configures the RIP instances accordingly to process job 103.

Front end 302 then distributes pages or segments of job 103 to RIP instances 3081, 3082, and 308*n*. Job 103 may be a print job that is split into segments or pages for parallel processing. As RIP instance 3082 is a high performance RIP, then it may receive specific pages or segments of job 103. Pages may refer to one or more pages of job 103. Segments of job 103 also may refer to a number of pages or a block of data within job 103. The pages or segments are distributed by front end 302 using inter-process communication.

RIP instances 3081, 3082, and 308*n* may read cross reference table 305 along with print ticket information and the spooled data for job 103. Each RIP instance then processes the page or segment that it is instructed to by front end 302. The RIP instance may check cross reference table 305 to obtain any instructions in the print ticket information and the data for the page or segment in spool drive 304. RIP instances 3081, 3082, and 308*n* then parse the data for the page or segment to create metadata from the drawing commands.

The RIP instances render the metadata to storage 306. Storage 306 may store the rendered pages for a print job of job 103. The rendered pages may be stored according to a specific image format, such as the KYOCERA™ Image Format (KIF). The stored pages may then be provided to print engine 260 to print document 112. For jobs 103 that do not require rendered pages, such as previews and estimates, the data generated by the RIP instances may be provided back to front end 302 for further operations.

RIP system 110 provides advantages over conventional RIP systems. Front end 302 may control the number of renderers per RIP. It may increase the number to process a page or segment faster. It also may increase the amount of memory allocated to the RIP as faster processing consumes more memory. If processing is to be slower, such as for estimate 114 or preview 116, then the configured RIP should consume less memory. Front end 302 manages these requirements through dynamic configuration of the RIPs based on the parameter of job 103.

In some instances, front end 302 may determine that job 103 is not able to be split into pages or segments for parallel processing. Thus, it may configure a RIP instance, such as RIP instance 308*n*, into a very high performance RIP. The very high performance RIP uses more renderers than the high performance RIP. For example, RIP instances 308*n* may be configured to use 8 renderers. This feature increases the processing speed of RIP instance 308*n*. Front end 302 may still use RIP instances 3081 and 3082 for parallel processing on one job 103 while using RIP instance 308*n* for processing another job 103 that is not able to be broken into pages or segments.

RIP system 110 provides features available due to the parallel processing using dynamically configured RIP instances. RIP system 110 may configure a high performance RIP to improve the first page out time. It also may use differently configured RIPs for different purposes, such a preview RIPs, estimation RIPs, and failover RIPs. RIP system 110 also may configure very high performance RIPs for jobs that cannot be processed in a page or segment parallel manner.

RIP system 110 also provides the ability to change the number of renderers per RIP. RIP system 110 also changes the number of RIP instances based on its workload, which includes shutting down certain types of RIPs in order to launch other types of RIPs. RIP system 100 also processes different kinds of jobs in RIPs with different configurations. RIP system 110 also uses different RIPs with different configurations for different purposes. It configures RIP instances with different imaging pipelines. RIP system 110 also retries failed jobs or job pages in a differently configured RIP instance.

Figure 4:
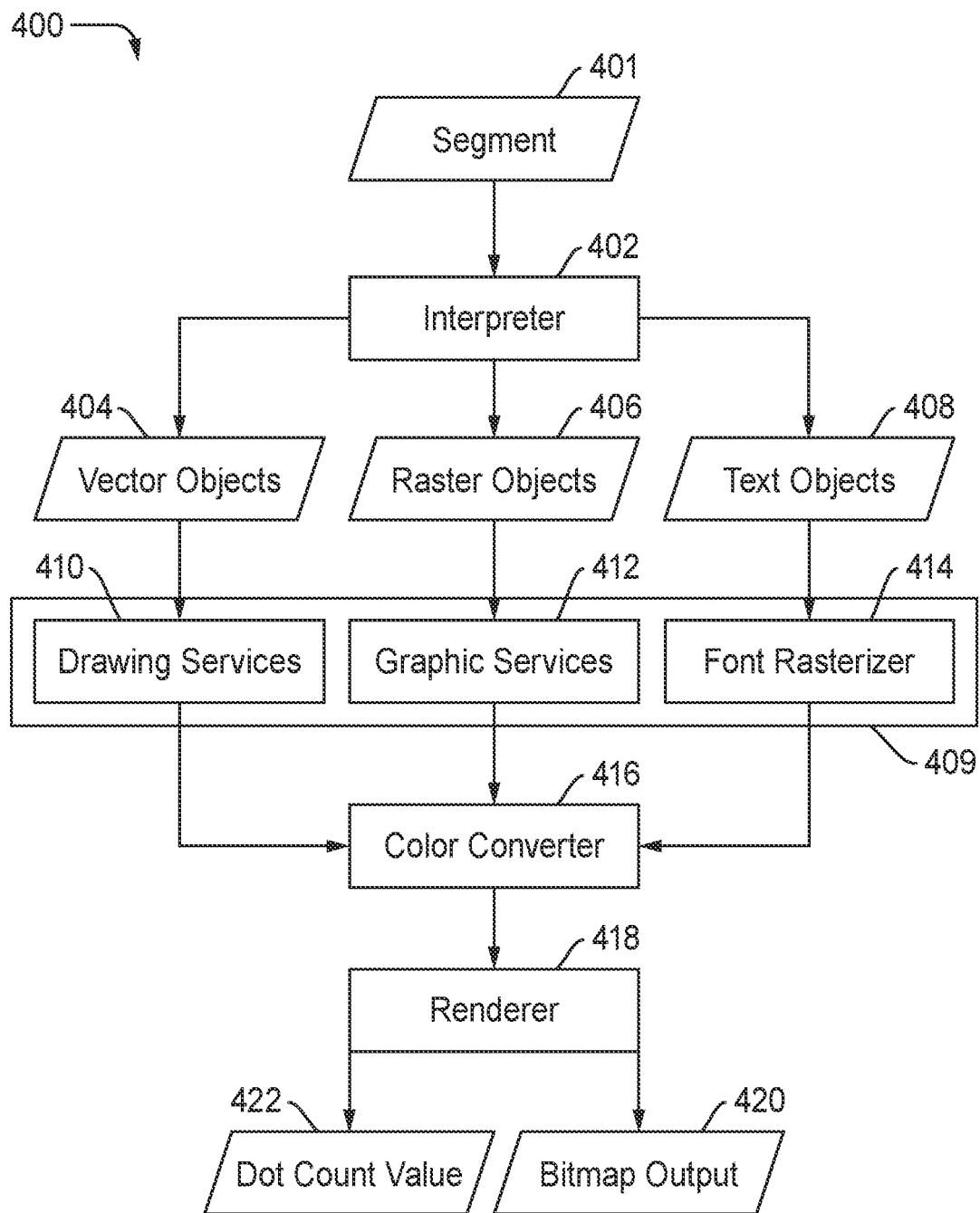
FIG. 4 illustrates a block diagram of an example RIP used within the RIP system according to the disclosed embodiments.

FIG. 4 depicts a block diagram of an example RIP 400 used within RIP system 110 according to the disclosed embodiments. RIP 400 may represent a configuration for RIP instances 3081, 3082, or 308*n*. RIP 400 may represent the hardware and software configuration used to determine what value each pixel or spot of output should possess, driven by commands from a page description language (PDL). Computer-generated output may be composed of very small spots. RIP 400 converts a vector-based image, or a stored image, into a series of mathematical formulas that describe lines and curves into a pattern of spots needed to generate the output, or raster image. Interpreter 402 converts a job file into a display list, which is then converted into a bitmap output 418 describing a page of the document.

RIP 400 converts text and image data from different file formats including PDF, TIFF, or JPEG into a format that printing device 104 can understand. The process of raster image processing a page implements several steps to be performed, regardless whether the page is submitted as PostScript, PDF, or any other page description language (PDL). In short, RIP 400 may provide interpretation, rasterization, and screening.

Segment 401 may be a job file associated with job 103. Segment 401 may be provided to RIP 400 to convert its code into raster or bitmap code. As disclosed above, front end 302 receives job 103. Front end 302 may split job 103 into segments for parallel processing by the RIP instances. Preferably, segment 401 is a page the document in job 103. RIPs process pages in a parallel manner within RIP system 100. RIP 400 is one of the RIP instances. In other embodiments, segment 401 may be several pages, a graphic design, or other portion of job 103.

Segment 401 is received at interpreter 402, which interprets the commands in the code to redraw the object and elements of a page as vector objects 404, raster objects 406, and text objects 408. Interpreter 402 parses specific PDLs into drawing commands. The PDL of segment 401 is read and decoded into graphical elements to be placed on a sheet. Each element may be an image, a character of text, a fill, stroke, and the like or listed in vector objects 404, raster objects 406, and text objects 408.

Drawing unit 409 receives vector objects 404, raster objects 406, and text objects 408 to convert the drawing commands into metadata that can be provided to renderer 418. Thus, drawing unit 409 converts vector objects 404 into drawing services 410. It also converts raster objects 406 into graphic services 412. It also converts text objects into font rasterizer 414.

RIP 400 also may implement color converter 416. Color converter 416 may implement color conversion operations for the metadata generated by drawing unit 409. Color converter 416 provides color management and calibration. These actions may be applied during interpretation or rendering, depending on configuration and job content. Color printing resources may be accessed to provide the color management.

Renderer 418 processes the metadata from drawing unit 409 to convert every graphical element into the appropriate pattern of pixels to form the output raster. The resolution independent vector objects 404 as drawing services 410 are converted into pixels. Screening takes the raster image of pixels to form individually screened cyan, magenta, yellow, and black separations. These are halftone dots in the form of a bitmap output 420 consisting of commands that can be understood by print engine 260.

The disclosed embodiments also may determine dot count value 422 from the rendered image provided by renderer 418. Dot count values may be adjusted based on screening and based on settings at printing device 104. Dot count value 422 may be reported to determine estimate 114 for an estimation job, as disclosed below.

The rendered bitmap output 420 may be stored in storage 306 to be sent to print engine 260 when all the pages or segments of job 103 are processed. RIP 400 shows one path for rendering and providing output. Preferably, RIP 400 multiple rendering paths that use multiple renderers. The disclosed embodiments may use a renderer 418 for each channel in RIP 400, such as one each for cyan, magenta, yellow, and black. The number of renderers 418 may be configured by front end 302 depending on job 103. Each renderer 418 requires memory and processing resources. A high number of renderers 418 in RIP 400 will consume more memory but run faster. A lower number of renderers 418 in RIP 400 will consume less memory but run slower.

Figure 5:
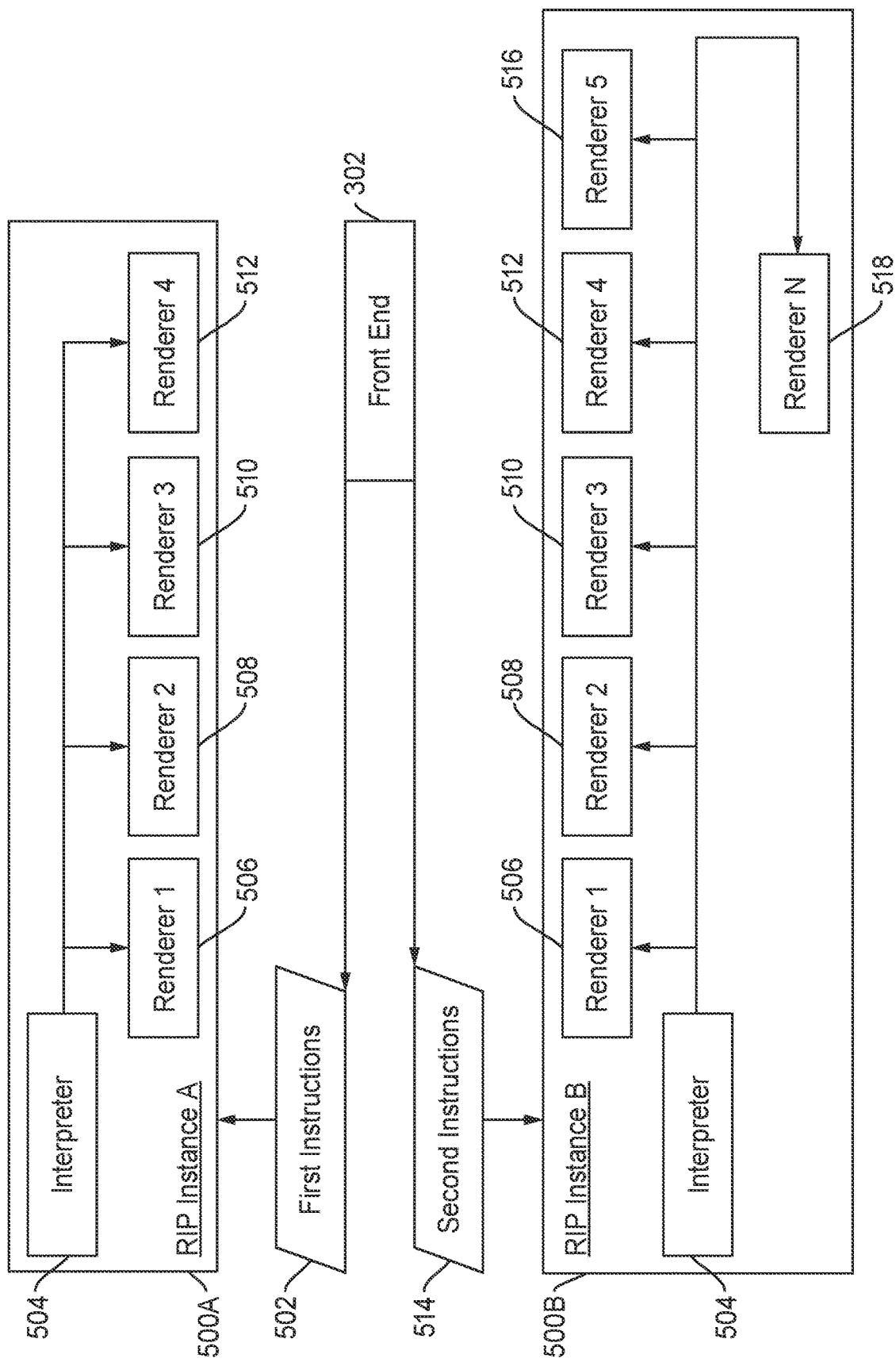
FIG. 5 illustrates a block diagram of a front end configuring a RIP instance according to the disclosed embodiments.

FIG. 5 depicts a block diagram of front end 302 configuring a RIP instance 500 according to the disclosed embodiments. Front end 302 may send instructions to RIP instance to change their configuration in response to a need for different RIPs within RIP system 110. These changes may include increasing the number of renderers within the RIP, decreasing the number of renderers within the RIP, changing the type for RIP, and the like. This feature enables RIP system 100 to be configurable to meet the processing requirements for different jobs.

Front end 302 may send first instruction 502 to RIP instance 500. RIP instance 500 may correspond to RIP 400, as disclosed above. The features of RIP 400 are not repeated here for brevity. RIP instance 500 may be considered a standard RIP that includes interpreter 504 along with renderer 1 506, renderer 2 508, renderer 3 510, and renderer 4 512. Renderers 506-512 may operate to perform functions in processing a print job, providing a preview, or providing an estimate.

First instruction 502 may instruct RIP instance 500 to modify its configuration to meet a current need within RIP system 110. For example, front end 302 may determine that RIP instance 500 needs to reconfigure itself to be a high performance RIP. First instruction 502 includes instructions to increase the number of renderers within RIP instance 500 to become a high performance RIP. The disclosed embodiments execute operation 520 to reconfigure RIP instance 500.

After operation 520 is completed, RIP instance 500 includes interpreter 504 along with an increased number of renderers. The increased number of renderers provide RIP instance 500 with increased processing capability but also takes up more memory and resources to accommodate the increased number of renderers. Thus, RIP instance 500 includes renderer 1 506, renderer 2 508, renderer 3 510, renderer 4 512, renderer 5 516, and renderer N 518. Renderer N 518 may be the last renderer implemented in RIP instance 500. In some embodiments, renderer N 518 may be the sixth renderer. In other embodiments, renderer N 518 may be the eighth renderer such that renderers 6 and 7 also are included in RIP instance 500, but not shown. RIP instance 500 now includes two or more additional renderers to perform processing of a print job, page, segment, and the like.

Front end 302 may receive another job 103 that requires RIP instance to be reconfigured back to a standard RIP. Second instruction 514 is received at RIP instance 500. Operation 522 is executed as a result to reconfigure RIP instance 500 back to four renderers. Processing capability may be reduced, but less memory and resources will be needed. Thus, front end 302 may dynamically configure the RIP instances to become different RIPs, as needed based on job requirements.

First instruction 502 also may instruct RIP instance 500 to configure into a preview RIP. This configuration would use the same resources of a standard RIP, so the number of renderers would remain the same. For example, if RIP instance 500 includes 4 renderers then the preview RIP would include 4 renderers. If RIP instance 500 includes 6 renderers then the preview RIP also would include 6 renderers. RIP instance 500, however, would be configured to generate a lower resolution output.

First instruction 502 also may instruct RIP instance 500 to configure into an estimation RIP. This configuration may reduce the number of renderers, even for a standard RIP.

Estimation RIPs use reduced memory allocation. Thus, if RIP instance 500 includes 6 renderers, then it may be reconfigured to have 4 renderers. In some embodiments, the number of renderers may be reduced from 4 to 2.

The disclosed embodiments may configure RIP instance 500 to include any number of renderers. The number of renderers depends on the processing capability needed for job 103. The more renderers, however, then the more memory and resources need to be allocated for the RIP instance. Thus, RIP system 110 may not want a large number of high performance or very high performance RIPs running all the time. Front end 302 dynamically configures RIP system 110 to meet the processing requirements for the received job, whether it is a print job, estimation job, or preview job.

Figure 6A:
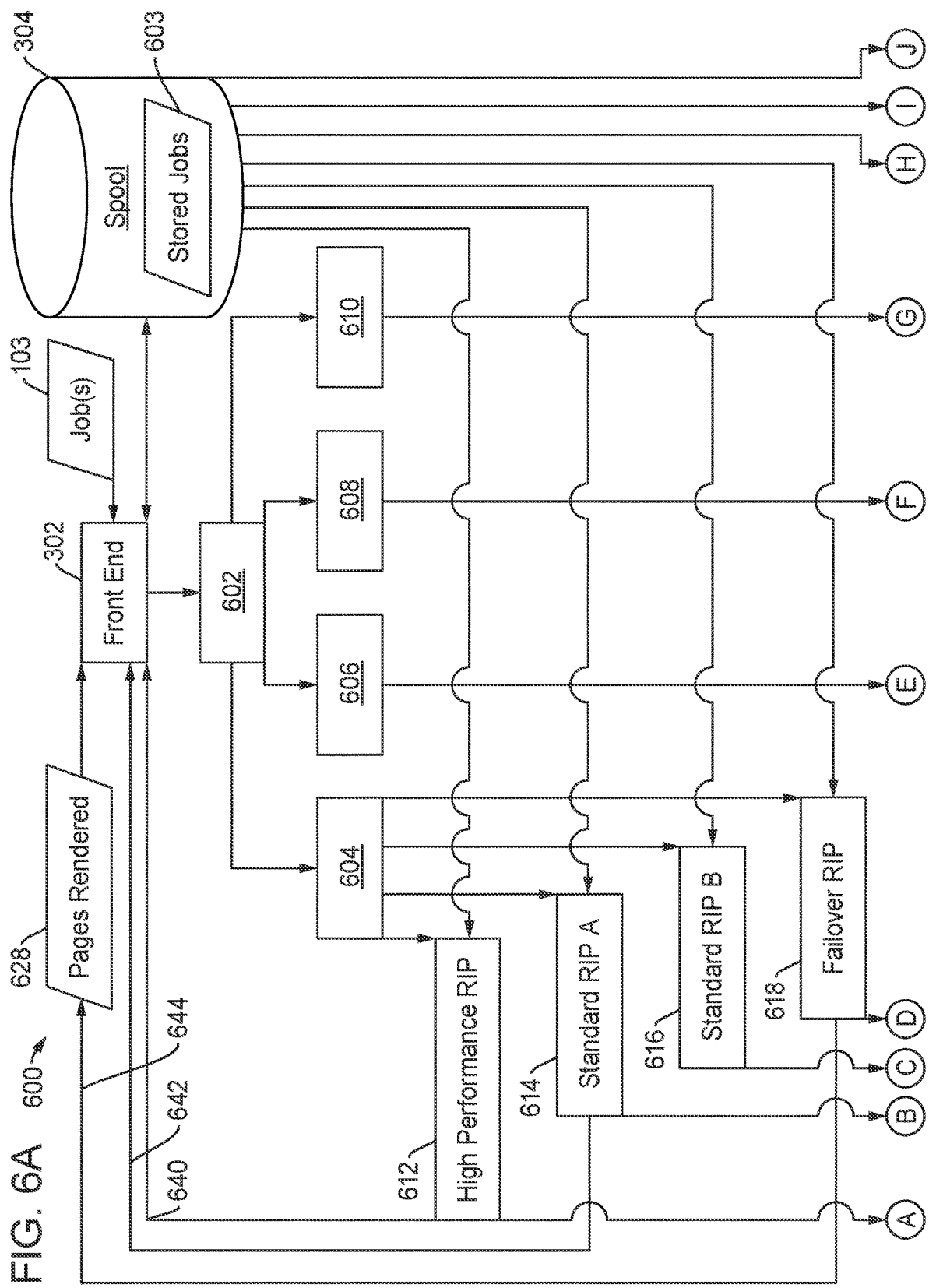
FIG. 6A illustrates a flow diagram for handling job flow within the RIP system according to the disclosed embodiments.
Figure 6B:
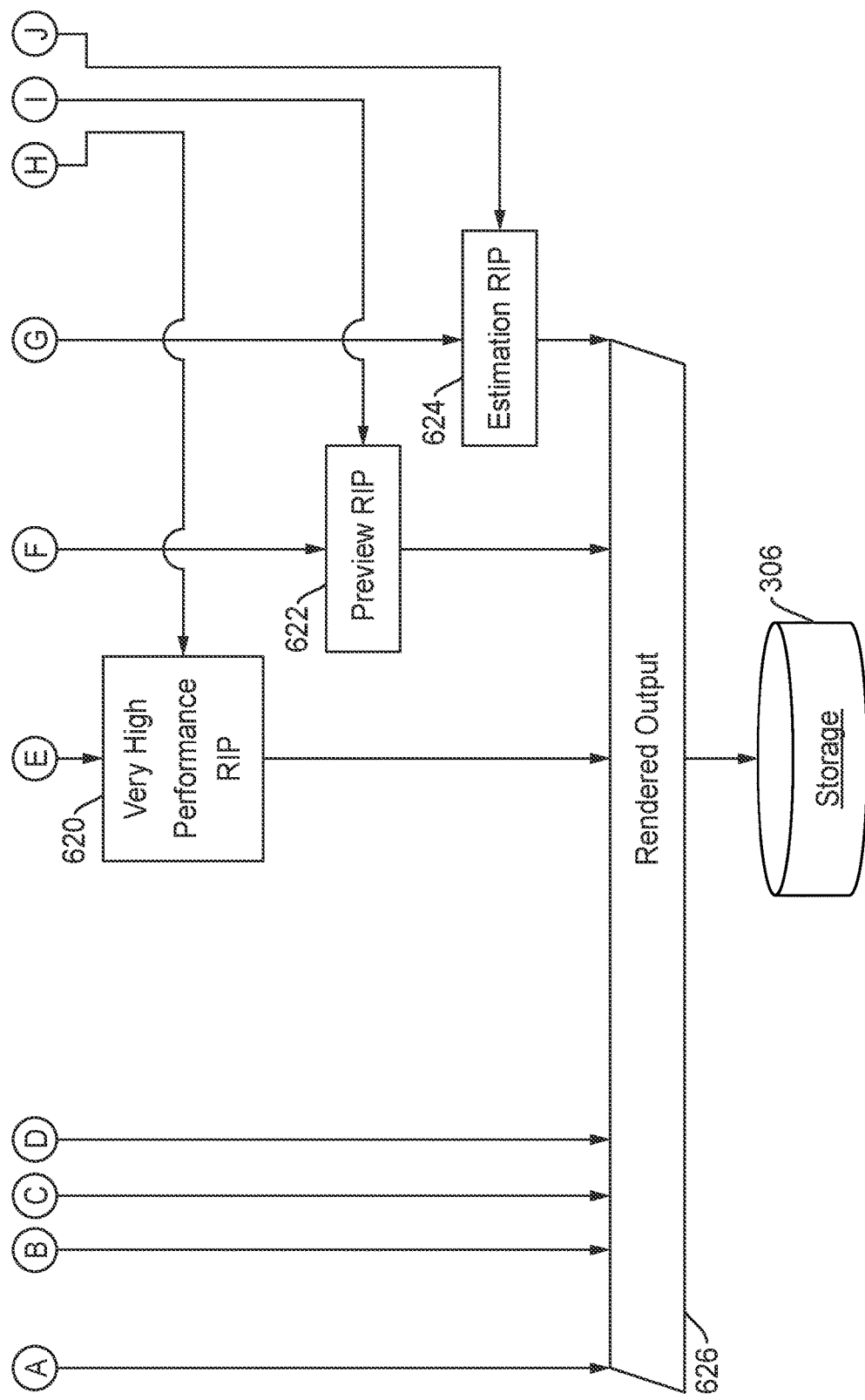
FIG. 6B further illustrates the flow diagram for handling job flow within the RIP system according to the disclosed embodiments.

FIGS. 6A and 6B depict a flow diagram 600 for handling job flow within RIP system 110 according to the disclosed embodiments. Flow diagram 600 may refer to FIGS. 1-5 for illustrative purposes. Flow diagram 600, however, is not limited to the embodiments disclosed by FIGS. 1-5.

Incoming jobs 103 are received at front end 302 of RIP system 110. Front end 302 executes operation 602 to determine the job type of each of the incoming jobs. Front end 302 also spools the data for each and stores the spooled data at spool drive 304 as stored jobs 603. Front end 302 treats the job within RIP system 110 according to the type of job.

For a print job, operation 604 executes by processing the print job in parallel. A certain number of standard RIPs will be configured as RIP instances. One RIP, however, will be configured as a high performance RIP to process the first page of the print job. Operations 604 sends the first page of the print job to high performance RIP 612. High performance RIP 612 includes additional resources, such as a higher number of renderers, to process the first page to be the first processed page available to front end 302 and to rendered output 626. As pages are placed in order within storage 306, the disclosed embodiments seek to have the first page rendered before the other pages.

Operation 604 also forwards each page, or segment, to RIPs to be processed in parallel so that print job can be rendered in a timely manner. Page 3 of the print job may be processed to standard RIP 614. Page x may be processed by standard RIP 616. While executing operation 604, RIP system 110 may determine that page 2 of the print job may not be processed by standard RIPs 614 and 616 or by high performance RIP 612. This situation may occur due to an out of memory error. Operation 604 sends page 2 to failover RIP 618 for processing.

While processing, high performance RIP 612 obtains the data for page 1 from spool drive 304. Cross reference table 305 may be used in obtaining the data. When complete, high performance RIP 612 sends a confirmation 640 to front end 302 that processing of page 1 is complete. The rendered output for page 1 is provided to rendered output 626. The same process may be used for standard RIPs doing the parallel processing. Standard RIP 614 obtains the data from spool drive 304 for page 3. When page 3 is rendered, confirmation 642 is sent to front end 302 to instruct it to provide another page or segment for processing using operation 604. The rendered output for page 3 is provided to rendered output 626. The standard RIPs may follow this process until the print job is complete.

Failover RIP 618 may receive an instruction from front end 302 via operation 604 to retrieve the data for page 2 from spool drive 304. Once complete, failover RIP 618 may provide pages rendered 628 to front end 302 while storing the rendered output for the pages in rendered output 626.

Referring back to operation 602, if a job 103 is a legacy, or non-Document Structuring Conventions (DSC), postscript job, then front end 302 may be not be able to break the job into pages or segments for parallel processing. Operations 606 executes by processing the print job using very high performance RIP 620. Very high performance RIP 620 may have large memory allocations, higher priority, and more parallel rendering threads than standard or high performance RIPs. Pages for the print job are provided to very high performance RIP 620 from spool drive 304. In some embodiments, operation 606 may be used to process a segment or page that requires additional processing. Once processing is complete, the rendered document for the print job is provided to rendered output 626. Very high performance RIP 620 also may confirm to front end 302 that it completed operation 606.

Referring back to operation 602, if a job 103 is a preview job, then operation 608 executes by using one or more preview RIPs 622 to process the job. Job 103 is not a print job in the sense that a document is printed at printing device 104. Instead, RIP system 110 generates a preview 116 that may be displayed on display device 120 for an operator to review. Front end 302 may configure a standard RIP into preview RIP 622. Operation 608 may instruct preview RIP 622 to process each page by retrieving the data from spool drive 304. The rendered output to use for preview 116 may be provided to rendered output 626.

Operation 602 may determine that a job 103 is an estimation job to generate estimate 114. Estimate 114 may be used to provide an ink or toner use estimate for printing job 103. The disclosed embodiments use information, such as dot count value 422, that is generated after rendering operations in making these estimates. Operation 610 executes by processing the estimation job using estimation RIP 624. Front end 302 may configure a standard RIP into estimation RIP 624. Operation 610 may instruct estimation RIP 624 to process each page by retrieving data from spool drive 304. The rendered output for estimate 114 is stored with rendered output 626.

RIP system 110 is capable of not only parallel processing a print job using a plurality of RIPs, it is capable of processing jobs in parallel. For example, job 1 is a print job that is processed using operation 604. Job 1 is processed by very high performance RIP 612 and standard RIPs 614 and 616 (operation 604 may use any number of high performance and standard RIPs). While job 1 is being processed, front end 302 determines that job 2 is a non-DSC postscript job that is to be processed at very high performance RIP 620. Very high performance RIP 620 is not impacted by the processing occurring at RIPs 612-616. RIPs 612-616 and 620 may process different jobs in parallel. This same feature also applies to job n-1, which is processed at preview RIP 622 using operation 608, and job n, which is processed at estimation RIP 624 using operation 610. In other words, operations 604, 606, 608, and 610 may execute in parallel.

Rendered output 626 may be stored in storage 306. Storage 306 provides the rendered jobs to print engine 260, if printing operations are needed. For estimates and previews, storage 306 may provide the rendered data to an estimation system or display device 120, respectively.

Figure 7:
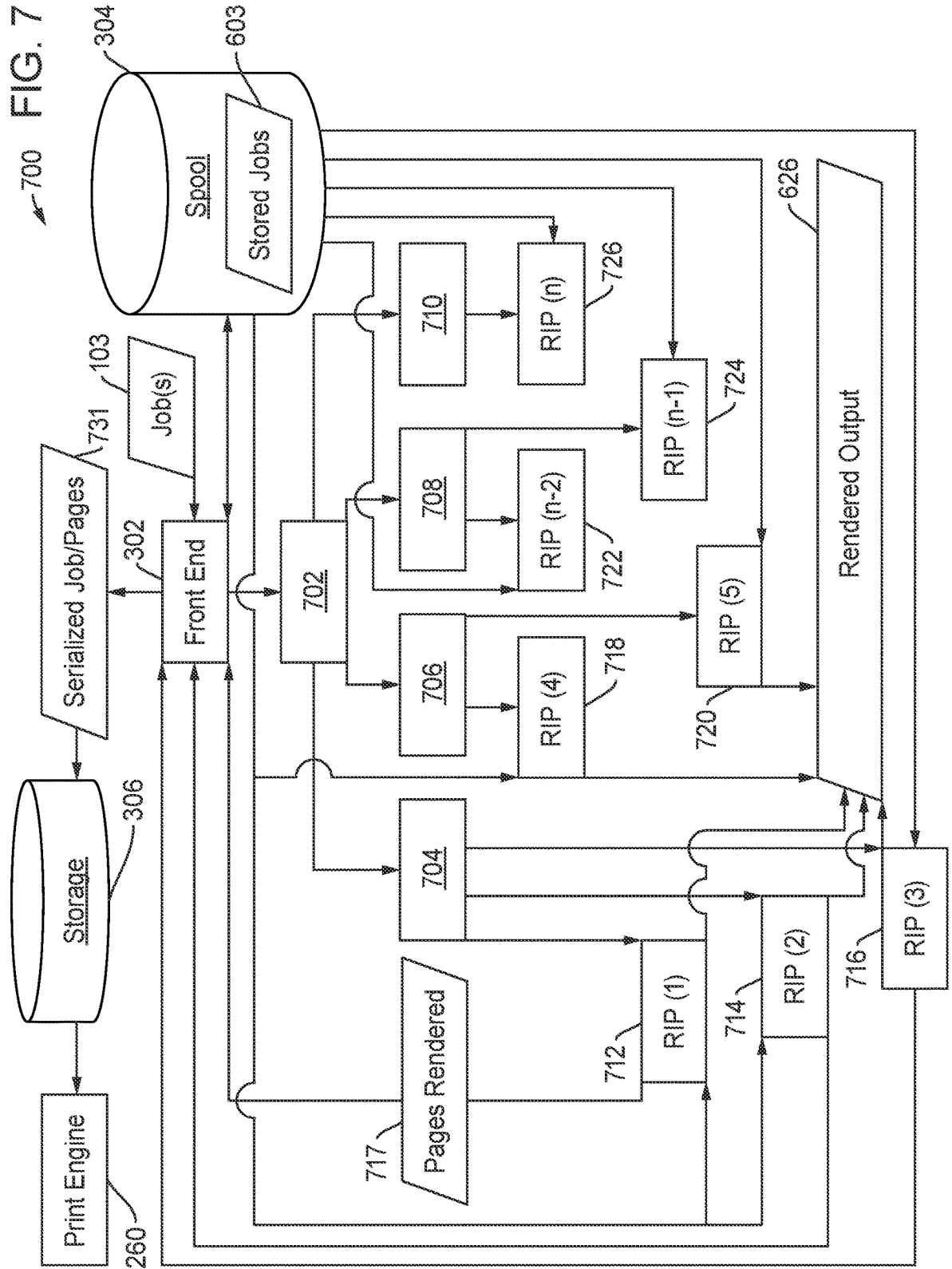
FIG. 7 illustrates a flow diagram for parallel processing within the RIP system according to the disclosed embodiments.

FIG. 7 depicts a flow diagram 700 for parallel processing within RIP system 110 according to the disclosed embodiments. Flow diagram 700 may refer to FIGS. 1-6 for illustrative purposes. Flow diagram 700, however, is not limited to the embodiments disclosed by FIGS. 1-6.

Incoming jobs 103 are received at front end 302. Front end 302 may perform the operations disclosed above by storing spooled data on spool drive 304 as stored jobs 603. A plurality of jobs may be stored thereon with access to the various jobs facilitated by cross reference table 305. The RIP instances within RIP system 110 may access the data within spool drive 304.

Operation 702 executes by determine the job PDL. In other words, each job 103 is created using a PDL type. Operation 702 determines the PDL type so that front end 302 can determine which subsequent operation to execute and which RIP instances to configure to process the job. If job 1 of jobs 103 is uses exchange job definition format (XJDF), then front end 302 may cause operation 704 to execute. Operation 704 executes by using RIPs 712, 714, and 716 to process job 1 in parallel.

For example, page 1 may be processed by RIP 712. In some embodiments, RIP 712 may be configured from a standard RIP to a high performance RIP. Page 2 is processed by RIP 714. Page 3 is processed by RIP 716. The output of the RIPs is provided to rendered output 626. RIP 712 retrieves the data for page 1 from spool drive 304. RIP 714 retrieves the data for page 2 from spool drive 304. RIP 716 retrieves the data for page 3 from spool drive 304. As rendered pages 717 are provided to front end 302, RIPs 712-716 may retrieve additional pages from spool drive 304. RIP 716 does not need to wait for RIP 714 to finish processing page 2 to retrieve the next page in job 1.

RIPs 712, 714, and 716 also provide rendered pages 717 to front end 302. Front end 302 may then serialize the rendered pages in order for job 1. Page 1 is before page 2, and so on. Front end 302 may store serialized pages 731 in storage 306, which then provides the pages to print engine 260 to produce document 112. Serialized pages 731 also may include serialized jobs, as disclosed below. Thus, operation 704 processes job 1 in a parallel manner to decrease rendering time for a print job.

Referring back to operation 702, job 103 may be have direct PDF format and treated as job 2 within RIP system 110. Operation 706 executes by processing job 2 in a parallel manner. Front end 302 may configure RIP 718 and RIP 720 to process job 2. Page 1 may be provided to RIP 718, which may be configured to be a high performance RIP, as disclosed above. RIP 720 may be a standard RIP that processes page 2. Operation 706 may execute much like operation 704 in that RIPs 718 and 720 access spool drive 304 to retrieve data from stored jobs 603 for the pages to be rendered. The rendered pages may be provided to front end 302 and the output to rendered output 626. Front end 302 may then serialize the pages to provide serialized pages 731 to storage 306.

Operation 706 differs from operation 704 in that front end 302 only may configure two RIP instances for processing job 2. Job 1 may have a higher priority than job 2. As can been seen, the disclosed embodiments do not assign the same number of RIP instances to process each print job. The disclosed embodiments may have front end 302 configure the number and type of RIPs differently. For example, RIP 712 may be configured to be a high performance RIP to process page 1 of job 1. RIP 718, however, may not be configured to a high performance RIP to process page 1 of job 2. Job 2 having direct PDF format may not need the processing power of a high performance RIP. Further, if job 2 is a lower priority print job than job 1, front end 302 may serialize the jobs in serialized pages and jobs 731. Not only are the pages provided in order but the jobs also are provided in order.

Referring back to operation 702, job n-1 may include a DSC PS format. Operation 708 executes by configuring RIPs 722 and 724 to process job n-1. RIP 722 may be the second to last RIP in RIP system 110. RIP 724 may be the first to last RIP in RIP system 110. RIP 726, as disclosed below, may be the last RIP in RIP system 110. Operation 708 processes job n-1 in parallel, much like operations 704 and 706. Front end 302 may configure both RIPs 722 and 724 to be high performance RIPs to increase processing capability for job n-1.

RIP 722 may process page 1 of job n-1. In some embodiments, RIP 722 may be configured to be a high performance RIP for fast processing of page 1. RIP 724 may process page 2 of job n-1. RIPs 722 and 724 process the pages of job n-1 in parallel. They may retrieve the data for the pages from spooled drive 304, wherein job n-1 is stored in stored jobs 603. Once completed, the pages may be provided to front end 302 to be sent to print engine 260 via storage 306.

Referring to operation 702, job 103 may include a non-DSC postscript format. If so, then operation 710 executes by processing job n accordingly. As disclosed above, job n may not be processed in parallel. One RIP instance will need to be used to process job n. Thus, front end 302 may configure RIP 726, which may be the last RIP available in RIP system 110, to be a very high performance RIP having an increased memory allocation and more renderers than a high performance RIP. RIP 726 may process page 1 first and so on. It also may retrieve the data for job n from spool drive 304 as job n is in stored jobs 603. The output may be provided to front end 302 to send to print engine 260 via storage 306.

Thus, RIP system 110 may include RIPs 712, 714, 716, 718, 720, 722, 724, and 726. Additional RIPs also may be provided but are not shown for brevity. Front end 302 may configure the RIPs to process job 1, job 2, job n-1, and job n by allocating RIPs to each operation. Job 1 may have a higher priority and, therefore, operation 704 is configured to have RIPs 712, 714, and 716. Jobs 2 and n-1 may have a lower priority so that operations 706 and 708 are configured accordingly. Further, front end 302 may configure the RIPs themselves to be standard RIPs, high performance RIPs, or very high performance RIPs, as needed. After completion of job n, front end 302 may configure RIP 726 back to a standard RIP to help with a new job 103 that results in another operation 704 for an XJDF format.

Further, jobs 1, 2, n-1, and n are processed in parallel. Not all RIPs are assigned to one job so that the jobs are processes sequentially. The jobs are processed in parallel. Again, operations 704, 706, 708, and 710 are processed in parallel so that RIP system 110 can handle not only parallel processing of a job but parallel processing of a plurality of jobs. Moreover, even though pages are used in disclosing flow diagram 700, segments of the print jobs may be used as well.

Figure 8:
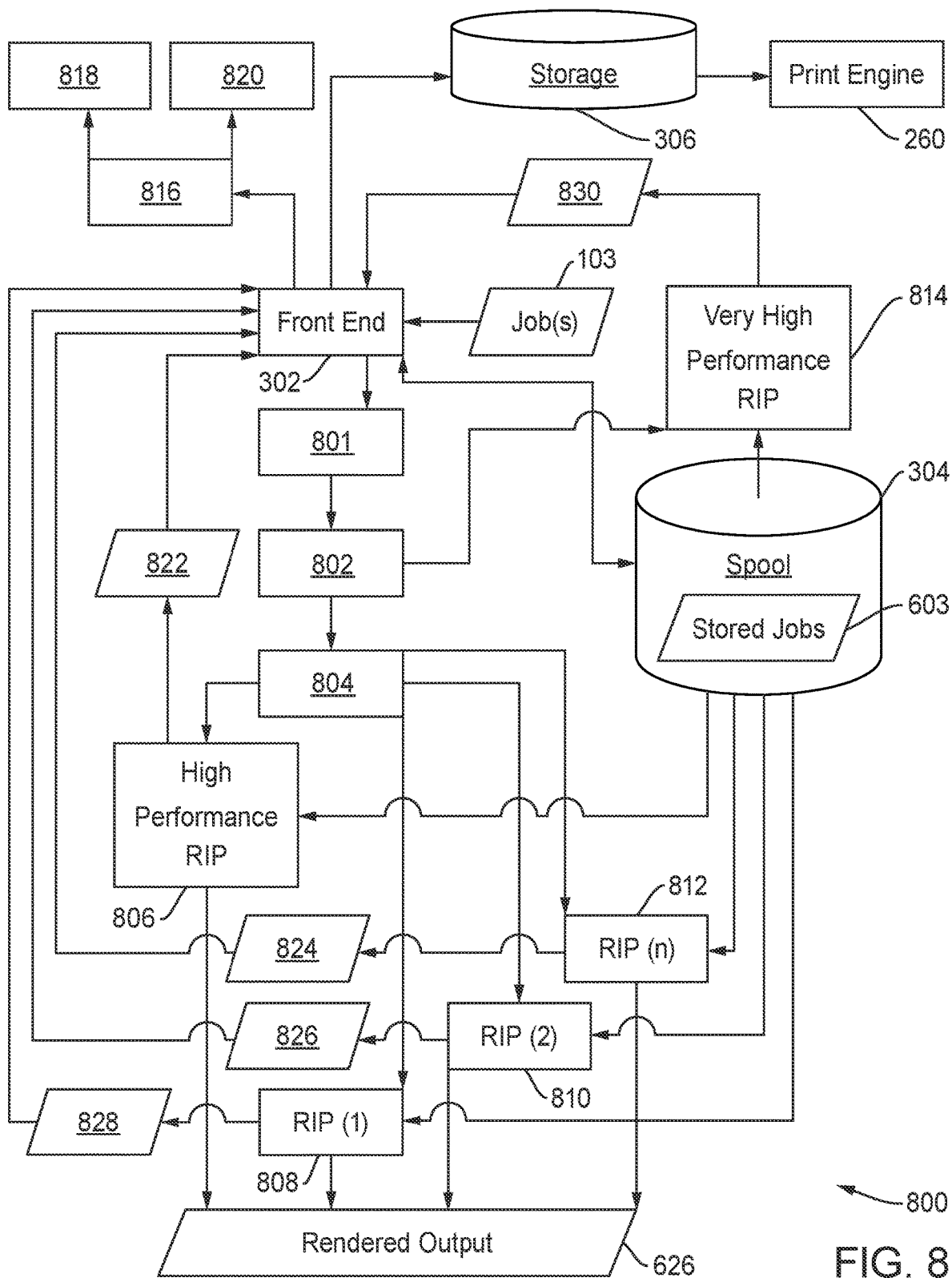
FIG. 8 illustrates a flow diagram for job flow between standard, high performance, and very high performance RIPs within the RIP system according to the disclosed embodiments.

FIG. 8 depicts a flow diagram 800 for job flow between standard, high performance, and very high performance RIPs within RIP system 110 according to the disclosed embodiments. Flow diagram 800 may refer to FIGS. 1-7 for illustrative purposes. Flow diagram 800, however, is not limited to the embodiments disclosed by FIGS. 1-7.

Front end 302 receives incoming jobs 103. These operations are disclosed above. For flow diagram 800, a single job 103 may be considered. Front end 302 stores spooled jobs in spool drive 304 and stored jobs 603. For flow diagram 800, a single stored job may be considered. Front end 302 executes operation 801 that executes by activing the RIPs within RIP system 110. In some embodiments, operation 801 may only activate standard, high performance, and very high performance RIPs as preview RIPs and estimation RIPs are not applicable.

Operation 802 executes by determining whether job 103 may be processed in parallel. In other words, does job 103 include a parallel page PDL that allows it to be processed in parallel. If yes, then operation 802 instructs flow diagram 800 to proceed to operation 804. Operation 802 also results in front end 302 configuring RIPs to process job 103 using parallel processing where each RIP instance will receive a page or segment for processing. Thus, front end 302 may configure high performance RIP 806 and standard RIPs 808, 810, and 812 for processing job 103. Additional RIPs also may be configured, depending on the requirements of job 103 and the priority. In some embodiments, high performance RIP 806 may be configured from a standard RIP to provide additional processing capability.

Operation 804 executes by determining whether the current page for processing by the RIPs is the first page of job 103. The first page should be provided to high performance RIP 806 in order to improve the first page out performance. If operation 804 is yes, then page 1 is provided to high performance RIP 806. High performance RIP 806 retrieves the associated data for page 1 from spool drive 304. It renders the output needed to print page 1 by print engine 260. Rendered page 1 822 is then provided to front end 302.

If operation 804 is no, then the page to be processed is not the first page and may be sent to a standard RIP within RIP system 110. Operation 804 provides the page to one of the standard RIPs configured by front end 302 to process job 103. Thus, page 2 may be sent to standard RIP 808. Page 3 may be sent to standard RIP 810, and so on up to page n being sent to RIP 812. RIP 812 may be the nth RIP configured by front end 302 to process job 103.

Once the pages are assigned to the RIPs, each RIP retrieves the data for its respective page from spool drive 304. Stored job 603 includes the pages to be processed. RIPs 808, 810, and 812 process their respective pages to render output that is provided to rendered output 626. They also provide the rendered pages to front end 302. RIP 808 provides rendered page 828 to front end 302. RIP 810 provides rendered page 826 to front end 302. RIP 812 provides rendered page 824 to front end 302.

As each rendered page is received by front end 302, the disclosed embodiments execute operation 816. Operation 816 executes by determining whether a page is remaining to be processed in job 103. For example, stored job 603 may still include pages to be processed even after page n is processed by RIP 812. If yes, then operation 818 executes by front end 302 sending the next page to the calling RIP that just provided the rendered page. Using the above example, the next page, or page n-1, will be provided to RIP 812. This process continues until all pages are rendered by the RIPs.

If operation 816 is no, then operation 820 executes by deactivating the calling RIP. Using the above example, front end 302 deactivates RIP 812, which just provided rendered page 824. Front end 302 then deactivates all the RIPs assigned to process job 103 until the processing is complete. After all RIPs are deactivated, front end 302 may provide the complete rendered job, serialized so that the pages or segments are in order, to storage 306. Storage 306 then communicates with print engine 260 to print document 112 for job 103.

Flow diagram 800, therefore, disclosed parallel processing with RIPs that are configured dynamically by front end 302 once it determines the status for the print job. RIPs are activated and deactivated as processing progresses. Deactivated RIPs may be reconfigured by front end 302 to process other jobs within RIP system 110. Thus, the optimal number of RIPs and resources are being used within RIP system 110 for more robust raster image processing.

Referring back to operation 802, if job 103 is not able to be processed in parallel using multiple RIPs, then front end 302 assigns the job to very high performance RIP 814. Very high performance RIP 814 retrieves the data for job 103 from spool drive 304. In some instances, it may retrieve stored job 603 completely. In other instances, it may retrieve the data page by page. As disclosed above, very high performance RIP 814 includes additional renderers to increase processing capability and speed. Very high performance RIP 814 also consumes more memory and resources that a high performance RIP or standard RIP.

Once processing of a page or segment is complete, very high performance RIP 814 provides rendered page, or segment, 830 to front end 302. Front end 302 may execute operations 816-820 until the processing for job 103 is complete on very high performance RIP 814. Once job 103 is completed, then the processed pages are provided to storage 306. Storage 306 sends the raster output to print engine 260.

Front end 302, once it determines a very high performance RIP is needed, may execute the operations disclosed above to configure a standard RIP into the very high performance RIP. This feature allows RIP system 110 to not have inactive RIPs that are not processing jobs. Front end 302 also may reconfigure very high performance RIP back to a standard RIP if it is not needed.

Figure 9:
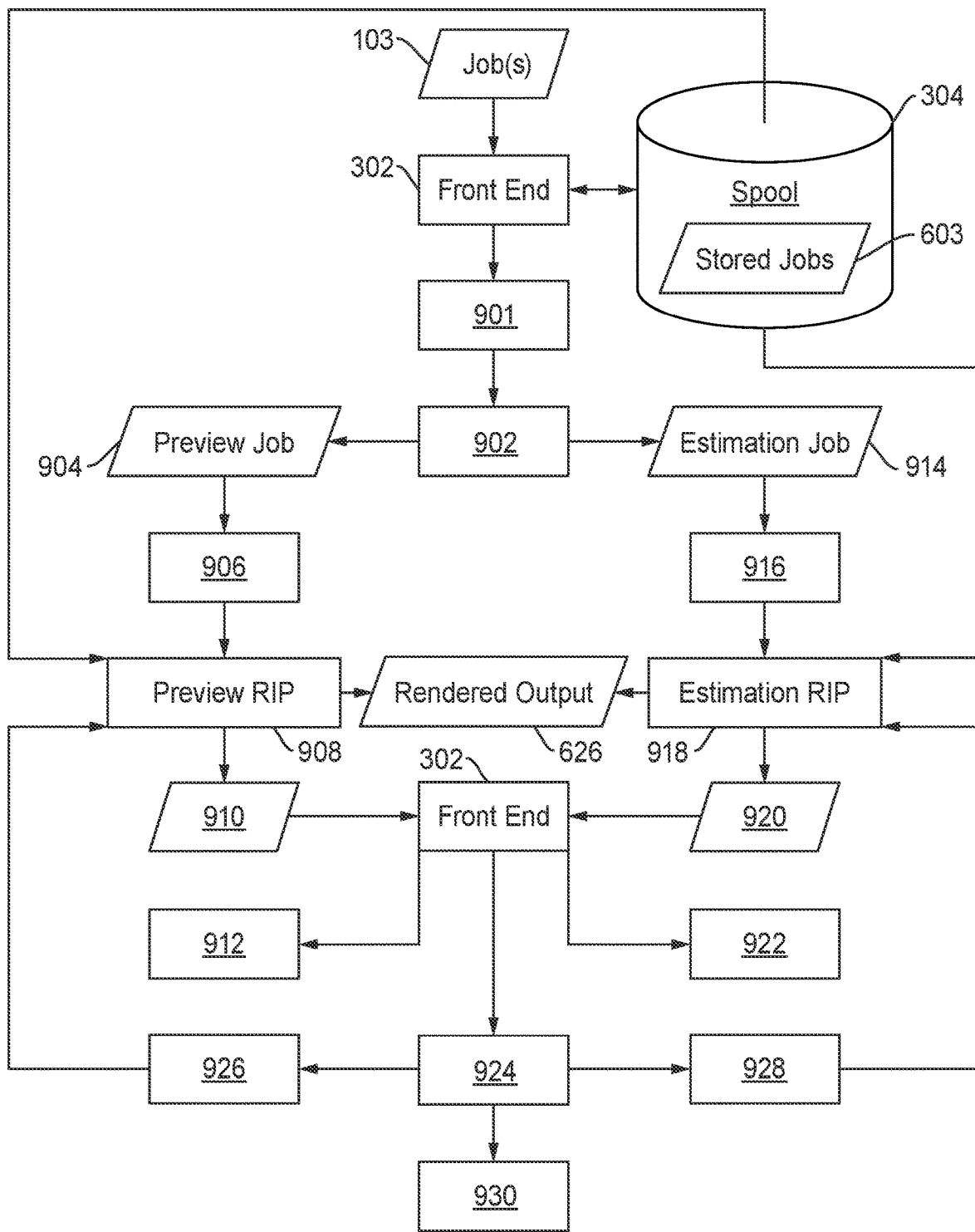
FIG. 9 illustrates a flow diagram for processing preview and estimation jobs within the RIP system according to the disclosed embodiments.

FIG. 9 depicts a flow diagram 900 for processing preview and estimation jobs within RIP system 110 according to the disclosed embodiments. Flow diagram 900 may refer to FIGS. 1-8 for illustrative purposes. Flow diagram 900, however, is not limited to the embodiments disclosed by FIGS. 1-8.

Front end 302 receives job 103, as disclosed above. These operations are disclosed above. For flow diagram 900, a single job 103 may be considered. Front end 302 stores spooled jobs in spool drive 304 and stored jobs 603. For flow diagram 900, a single stored job may be considered. Front end 302 executes operation 901 that executes by activing the RIPs within RIP system 110. In some embodiments, operation 901 may only activate preview RIPs and estimation RIPs are not applicable as standard, high performance, and very high performance RIPs are not applicable.

Operation 902 executes by determining the job type for job 103. In flow diagram 900, this operation determines if job 103 is a preview job 904 or an estimation job 914. If it is a print job, then front end 302 may implement flow diagram 800. The determination of the type of job results in front end 302 configuring the right RIP to process the job.

If job 103 is a preview job 904, then operation 906 executes by activating a preview RIP 908 to process the job. In some embodiments, front end 302 may configure a standard RIP to be preview RIP 908. Preview RIP 908 may be configured by front end 302 to quickly generate lower resolution output when compared to RIPs generating rendered output for printing. Preview RIP 908 may include the same resources as a standard RIP or a high performance RIP, but it is configured to generate lower resolution output for the previews. Previews are not printed but are presented to the operator for review.

Page 1 may be provided to preview RIP 908. RIP 908 retrieves the data for page 1 from stored job 603 in spool drive 304. Preview RIP 908 processes page 1 to generate rendered page 910. The rendered output also is provided to rendered output 626. Rendered page 910 is sent to front end 302. Front end 302 executes operation 912 by sending the preview generated by rendered page 910 to a user interface on display device 120. Thus, the user interface at the display device may receive pages as they are rendered. In some embodiments, segments may be rendered, which include multiple pages or portions of job 103.

After sending rendered page 1 to display device 120, front end 302 proceeds to operation 924, which executes by determining if there is a page remaining for job 103. If yes, then operation 926 executes by sending the next page to preview RIP 908. An instruction may be provided for preview RIP 908 to retrieve the next page from stored job 603. Thus, page 2 is processed by preview RIP 908.

If operation 924 is no, then operation 930 executes by deactivating preview RIP 908. Front end 302 may deactivate preview RIP 908 for use in other operations within RIP system 110.

Referring back to operation 902, if job 103 is estimation job 914, then front end 302 configures estimation RIP 918 to process the job. Operation 916 executes by activating estimation RIP 918. In some embodiments, front end 302 may configure a standard RIP to be estimation RIP 918. Estimation RIP 918 is configured to process jobs without impacting production. Estimation RIP 918 may have reduced memory allocation, lower priority, and a reduced number of renderers as compared to a standard RIP. Ink or toner estimates are requested by the operator. The estimates are not treated as time sensitive so that estimation RIP is configured to use minimal resources that do not impact production printing.

Estimation RIP 918 receives page 1 of job 103. Estimation RIP 918 retrieves the data for page 1 from stored job 603 in spool drive 304. Estimation RIP 918 generates rendered page 920. It also generated rendered output that is stored with rendered output 626. Front end 302 receives rendered page 920. Front end 302 may perform ink or toner estimation operations, or it may send the information for rendered page 920 to an estimation system. Operation 922 executes by sending the estimate to display device 120. Operation 922 also may send the estimate to another device, such as client device 102 or printing device 104.

Front end 302 also may invoke operation 924, as disclosed above. If there are one or more additional pages to be processed for estimation job 914, then operation 928 executes by sending the next page to estimation RIP 918. Operation 928 executes similar to operation 926. If no pages are left to process, then operation 930 executes by deactivating estimation RIP 918.

Figure 10:
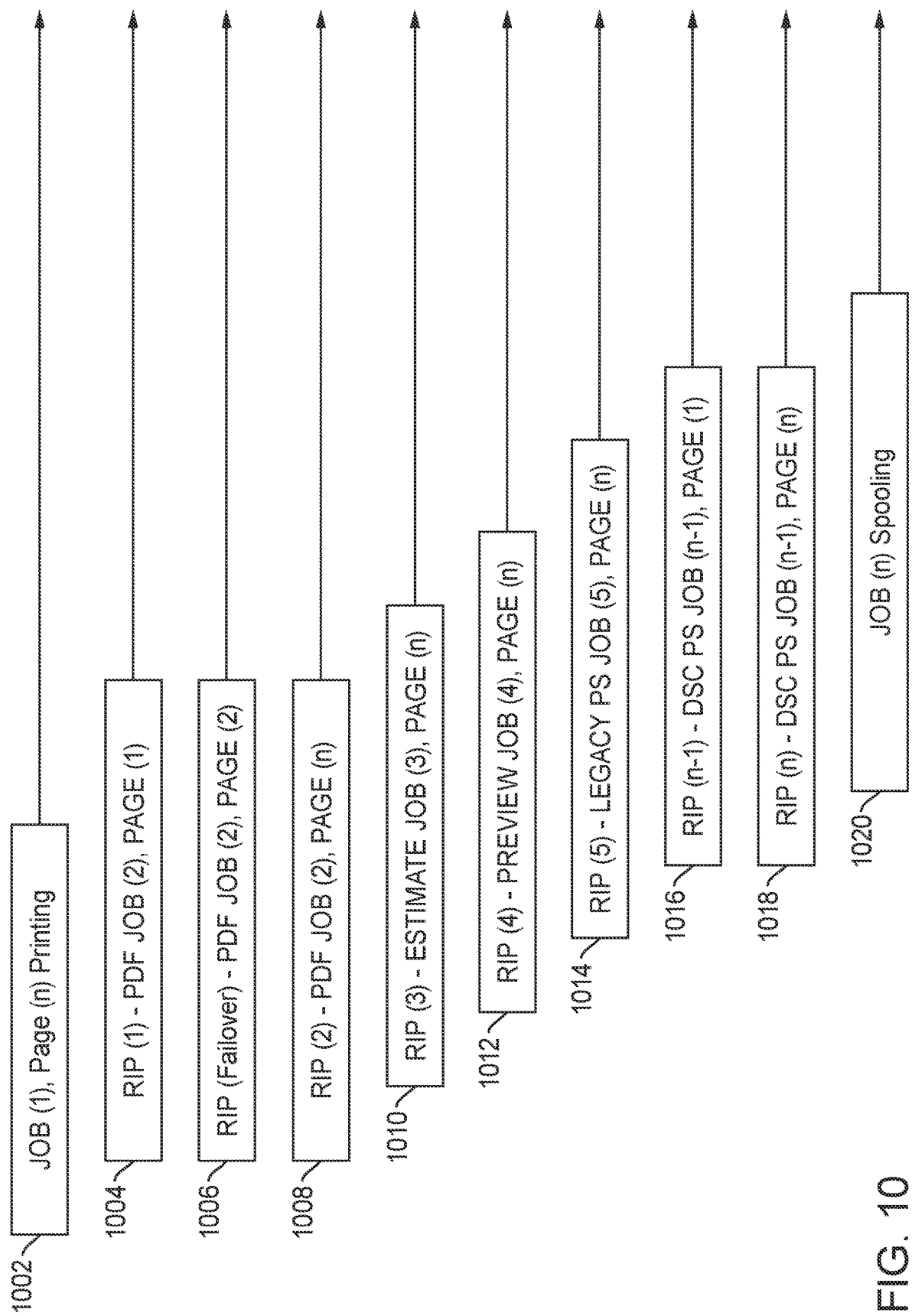
FIG. 10 illustrates a block diagram of parallel processing operations using the RIP system according to the disclosed embodiments.

FIG. 10 depicts a block diagram of parallel processing operations using RIP system 110 according to the disclosed embodiments. The block diagram shows the parallel processing of pages or segments as well as jobs within RIP system 110. RIP system 110 may process n jobs at one time. RIP instances are configured by front end 302 to process jobs as needed. The configuration is dynamic as the RIPs used to process a specific job may change. The RIPs themselves also may change.

Task 1002 shows job 1 being printed using print engine 260. Page n of job 1 is being printed. Front end 302 may provide the rendered output to print engine 260 to print each page of job 1. The RIPs of RIP system 110 already processed job 1.

Task 1004 shows RIP 1 processing page 1 of job 2 within RIP system 110. Job 2 is separate from job 1. Job 2 may be a PDF print job for a document. RIP 1 may be a high performance RIP configured to process the first pages of print jobs. Task 1006 shows a failover RIP processing page 2 of job 2. Due to an error in processing page 2 at a standard RIP, front end 302 may push page 2 to the failover RIP. The data for page 2 is different from page 1 in job 2. Task 1008 shows RIP 2 processing page n for job 2. RIP 2 may have initially processed page 2 of job 2 that is now being processed by the failover RIP. As a result, RIP 2 retrieves data for the next page of job 2 to be processed. Tasks 1004, 1006, and 1008 execute in parallel to process job 2 in parallel.

Task 1010 shows RIP 3 being used as an estimation RIP to provide an ink or toner use estimate for job 3. Estimation RIP 3 is currently processing page n of job 3. After processing page n is complete, estimation RIP 3 will process page n+1, unless page n is the last page of the document. Task 1010 may occur later in the pipeline of tasks and jobs than tasks 1004, 1006, and 1008 as job 3 is received after job 2, or has a lower priority than job 2. Further, task 1010 may execute at the same time as tasks 1002-1008 without drawing resources from those tasks.

Task 1012 shows RIP 4 being used as a preview RIP to provide a preview of job 4 for review and interaction by the operator. RIP 4 is currently processing page n of job 4. After processing page n is complete, preview RIP 4 will process page n+1, unless page n is the last page of the document. The generated preview may be sent to display device 120 within printing system 100. Task 1012 may occur later in the pipeline of tasks and jobs than tasks 1004-1010 as job 4 is received after jobs 2 and 3, or has a lower priority than jobs 2 and 3. Further, task 1012 may execute at the same time as tasks 1002-1010 without drawing resources from those tasks.

Task 1014 shows RIP 5 processing a legacy PS job 5. Job 5 may not be able to be processed in parallel so that one RIP is assigned to generate the output for printing. Thus, RIP 5 may be configured by front end 302 to be a very high performance RIP. Very high performance RIP 5 is processing page n of job 5. After processing page n is complete, very high performance RIP 5 will process page n+1, unless page n is the last page of the document. After completion of rendering processing, the rendered output is provided to front end 302.

Task 1016 shows RIP n-1 processing page 1 of DSC PS job n-1. Job n-1 may be a print job received at front end 302 after jobs 1-5. Other jobs may be processing in RIP system 110, but not shown here. Thus, there may be additional tasks being executed as well. Task 1018 shows RIP n processing page n of job n-1. Job n-1 may only need two RIPs to complete parallel processing.

Task 1020 shows front end 302 spooling job n. Job n may be the most recent job received within RIP system 110. After spooling, front end 302 will determine what type of job is job n and configure the RIP instances accordingly. It should be noted that tasks 1002-1020 are executing in parallel. Further, jobs 1, 2, 3, 4, 5, n-1 and n are being processed in parallel. Thus, RIP system 110 is able to process job in a dynamic and optimal manner that increases speed and capability within a production printing system.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more printing systems coupled to a network capable of exchanging information and data. Various functions and components of the printing system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

The invention claimed is:

1. A method for performing printing operations, the method comprising:
   receiving a preview job at a raster image processor (RIP) system of a print management server,
   wherein the RIP system is a separate component from a controller of a printing device;

storing the preview job at a spool drive of the RIP system by the RIP system, wherein the preview job is not rendered;

assigning the preview job to at least one RIP within the RIP system;

activating a preview RIP from the at least one RIP by the RIP system, wherein the preview RIP is configured from a first standard RIP of a plurality of RIPs by the RIP system to generate a lower resolution and downscaled output than a second standard RIP of the plurality of RIPs within the RIP system;

processing at least one segment of the preview job at the preview RIP; and deactivating the preview RIP by the RIP system upon completion of the processing of the at least one segment.

2. The method of claim 1, further comprising providing a preview image of the at least one segment of the preview job from the preview RIP to the controller of the printing device.

3. The method of claim 2, further comprising displaying the preview image at the printing device.

4. The method of claim 1, further comprising displaying a preview image of the at least one segment of the print job.

5. The method of claim 4, wherein the displaying includes displaying the preview image in a user interface.

6. The method of claim 1, further comprising processing another job separate from the preview job at the second standard RIP from the plurality of RIPs within the RIP system.

7. The method of claim 6, wherein the preview RIP downscales an image and uses reduced memory compared to the second standard RIP.

8. The method of claim 1, further comprising configuring the preview RIP to process the preview job.

9. A printing system comprising:

a printing device having a controller;

a print management server configured to include a raster image processor (RIP) system and receive a preview job at the RIP system;

wherein the RIP system is configured to store the preview job that is not rendered and to activate a preview RIP from at least one RIP of a plurality of RIPs within the RIP system, wherein the RIP system is a separate component from the controller of the printing device, wherein the preview RIP is configured from a first standard RIP of the plurality of RIPs to process at least one segment of the preview job to generate a preview image and configured to generate a lower resolution and downscaled output than a second standard RIP of the plurality of RIPs within the RIP system, wherein the RIP system assigns the at least one segment of the preview job to the preview RIP, wherein the RIP system deactivates the preview RIP upon completion of the processing of the at least one segment; and a device to display the preview image from the preview RIP.

\* \* \* \* \*